(12) United States Patent
Hollenbeck et al.

(10) Patent No.: US 7,934,762 B2
(45) Date of Patent: May 3, 2011

(54) VEHICLE WITH SLEEPING ARRANGEMENT

(75) Inventors: Bruce P. Hollenbeck, Orefield, PA (US); Clarence A. Greeney, Kernersville, NC (US)

(73) Assignee: Mack Trucks, Inc., Greensboro, NC (US)

( * ) Notice: Subject to any disclaimer, the term of this patent is extended or adjusted under 35 U.S.C. 154(b) by 332 days.

(21) Appl. No.: 12/085,795

(22) PCT Filed: Dec. 13, 2005

(86) PCT No.: PCT/US2005/045016
§ 371 (c)(1),
(2), (4) Date: May 30, 2008

(87) PCT Pub. No.: WO2007/070027
PCT Pub. Date: Jun. 21, 2007

(65) Prior Publication Data
US 2010/0140010 A1    Jun. 10, 2010

(51) Int. Cl.
B60N 2/04 (2006.01)
(52) U.S. Cl. ........................................................ 296/64
(58) Field of Classification Search ................ 296/69, 296/65.01, 65.05, 65.06, 65.09, 65.11; 297/1, 297/118, 232, 283.1, 283.2, 283.3, 285, 300.1, 297/344.4, 344.21; 244/118.6
See application file for complete search history.

(56) References Cited

U.S. PATENT DOCUMENTS

| | | | |
|---|---|---|---|
| 1,974,376 A | 9/1934 | Edwards | |
| 4,341,415 A * | 7/1982 | Braun et al. | 296/64 |
| 4,834,452 A * | 5/1989 | Goodrich | 297/240 |
| 5,029,929 A | 7/1991 | Sjostrom | |
| 5,636,884 A * | 6/1997 | Ladetto et al. | 296/65.13 |
| 6,024,398 A * | 2/2000 | Horton et al. | 296/65.07 |
| 6,027,170 A | 2/2000 | Benz | |
| 6,059,364 A * | 5/2000 | Dryburgh et al. | 297/354.13 |
| 6,209,956 B1 * | 4/2001 | Dryburgh et al. | 297/245 |
| 6,460,929 B2 | 10/2002 | Kamida | |
| 6,668,397 B2 | 12/2003 | Olenick | |
| 6,669,141 B2 * | 12/2003 | Schmidt-Schaeffer | 244/118.6 |
| 6,845,531 B2 * | 1/2005 | Kjellberg et al. | 5/118 |
| 7,213,882 B2 * | 5/2007 | Dryburgh et al. | 297/354.13 |
| 7,419,214 B2 * | 9/2008 | Plant | 297/245 |
| 7,533,930 B1 * | 5/2009 | Fissette et al. | 297/118 |
| 7,665,693 B2 * | 2/2010 | Bettell | 244/122 R |

FOREIGN PATENT DOCUMENTS

| | | | |
|---|---|---|---|
| EP | 248373 A2 * | 12/1987 | |
| EP | 291894 A2 * | 11/1988 | |

* cited by examiner

*Primary Examiner* — Hilary Gutman
(74) *Attorney, Agent, or Firm* — Martin Farrell; Michael Pruden

(57) ABSTRACT

A vehicle with a sleeping arrangement includes a vehicle compartment, a driver's seat mounted in the compartment, the driver's seat having a bottom cushion portion and a back portion, and a passenger's seat mounted in the compartment, the passenger's seat having a bottom cushion portion and a back portion. At least one of the driver's seat and the passenger's seat may be pivotable from a normal use position facing a front of the compartment to a sleeping position oriented approximately 90° relative to the normal use position, and the pivotable seat is adapted to recline such that the bottom cushion portion and the back portion of the pivotable seat defines at least part of a generally horizontal surface together with the bottom cushion portion of the other one of the driver's seat and the passenger's seat.

15 Claims, 6 Drawing Sheets

VEHICLE WITH SLEEPING ARRANGEMENT

The present invention relates generally to trucks and, more particularly, to trucks with driver sleeping arrangements and related features.

Trucks are typically divided into the following categories: heavy duty trucks (above 33,000 lbs (14,968 kg) Gross Vehicle Weight GVW); medium duty trucks (19,500 lbs (8845 kg) to 33,000 lbs (14,968 kg)); or light duty trucks (10,000 lbs (4536 kg) to 19,500 lbs (8845 kg)). Heavy duty trucks are typically divided into the following categories: long haul highway-type trucks with sleeper cabs; distribution highway-type trucks without sleepers; and vocational trucks, which are specialized trucks with bodies mounted on the vehicle frames, such as concrete mixers, dump bodies, block trucks, refuse collection bodies, etc. Medium duty trucks are often distribution vehicles for metropolitan goods transport. Light duty trucks are often distribution vehicles for local and city goods delivery.

Various regulations limit the amount of time that a driver can operate a truck over the course of a day. When the driver has exceeded that limit and is not somewhere near the driver's base of operations, unless the truck is provided with a sleeper cab, the driver may have to rent a room or obtain some other kind of short-term lodging. The driver may, in some instances, try to sleep in the truck cab but this is typically uncomfortable.

It also often happens that a driver will simply become tired and want to take a short nap. The driver may try to sleep in the truck cab but, as noted, this is typically uncomfortable. Likewise, the driver may be required to wait for an extended period of time during, for example, a delivery or a pick-up, and sitting in the driver's seat or waiting outside of the cab may become tiresome or uncomfortable. Again, the driver may try to sleep or lie down in the truck cab.

It is desirable to provide an arrangement for truck cabs that will facilitate allowing drivers to sleep or rest in a substantially inclined position. It is also desirable to provide such an arrangement in trucks that are not provided with sleeper cabs.

In accordance with an aspect of the present invention, a vehicle with a sleeping arrangement includes a vehicle compartment, a driver's seat mounted in the compartment, the driver's seat having a bottom cushion portion and a back portion, and a passenger's seat mounted in the compartment, the passenger's seat having a bottom cushion portion and a back portion. At least one of the driver's seat and the passenger's seat is pivotable from a normal use position facing a front of the compartment to a sleeping position oriented approximately 90° relative to the normal use position, and the pivotable seat is adapted to recline such that the bottom cushion portion and the back portion of the pivotable seat defines at least part of a generally horizontal surface together with the bottom cushion portion of the other one of the driver's seat and the passenger's seat.

In accordance with another aspect of the present invention, a vehicle with a sleeping arrangement includes a vehicle compartment, a driver's seat mounted in the compartment, a passenger's seat mounted in the compartment, and a cushion arrangement mounted in the vehicle compartment. The cushion arrangement is =foldable and adapted to cooperate with the driver's seat and the passenger's seat to define a generally horizontal surface.

In accordance with still another aspect of the present invention, a vehicle with a foldable lever arrangement includes a vehicle compartment and a lever mounted to the vehicle compartment. The lever includes a joint arrangement having a locked mode in which the lever is movable to at least one use position and the joint arrangement having an unlocked mode in which the lever is movable between at least one use position and a folded position.

BRIEF DESCRIPTION OF THE DRAWINGS

The features and advantages of the present invention are well understood by reading the following detailed description in conjunction with the drawings in which like numerals indicate similar elements and in which.

DETAILED DESCRIPTION

Figure 1:
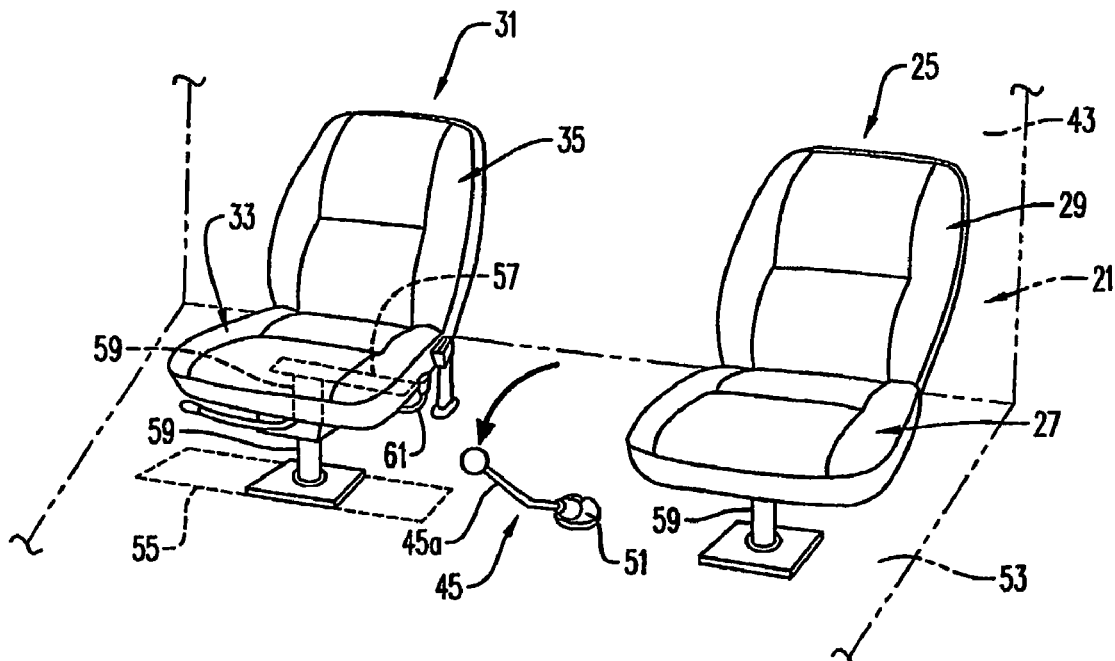
FIG. 1 is a perspective view of a vehicle adapted to have a sleeping arrangement according to an embodiment of the present invention.

A portion of an interior of a compartment of a vehicle is shown in FIG. 1. In the embodiment of FIG. 1, the compartment is a cab 21 and the vehicle is a truck with a driver sleeping arrangement 23 according to an embodiment of the present invention. The portion of the truck outside of the cab 21 is not shown. In a typical embodiment, the cab 21 is a day cab of a truck.

A driver's seat 25 is mounted in the cab 21. The driver's seat 25 has a bottom cushion portion 27 and a back portion 29. In the illustrated embodiment, the driver's seat 25 is shown on the left-hand side of the cab 21, however, the driver's seat can be disposed on the right-hand side of the cab.

A passenger's seat 31 is also mounted in the cab 21 The passenger's seat 31 has a bottom cushion portion 33 and a back portion 35. The passenger's seat 31 is shown on the right-hand side of the cab 21 in the illustrated embodiment, however, it will be appreciated that the passenger's seat can be disposed on the left-hand side of the cab.

Figure 2:
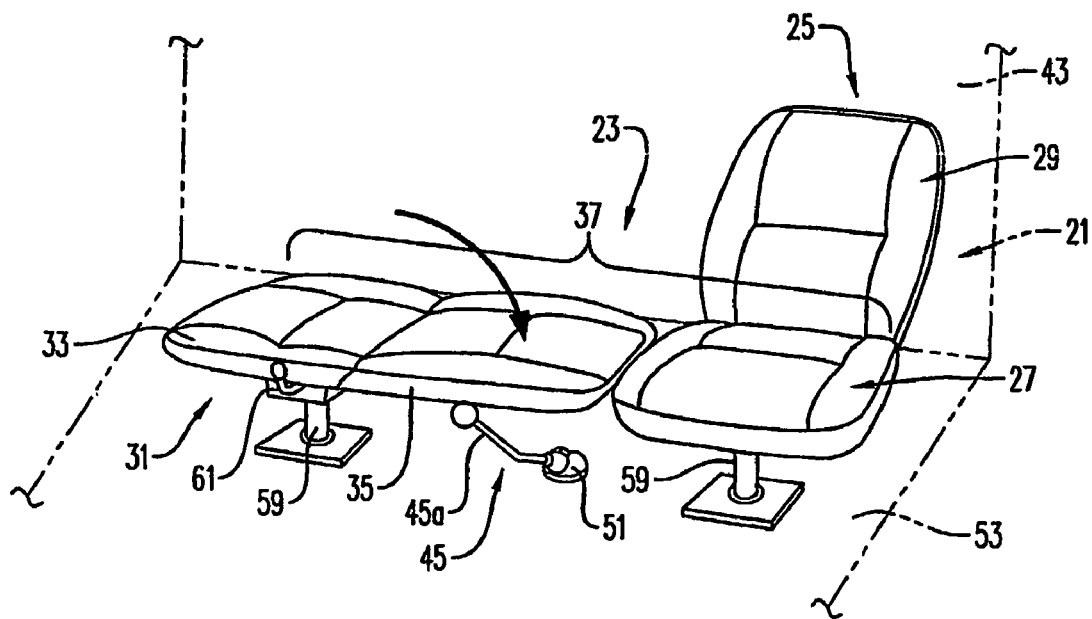
FIG. 2 is a perspective view of a vehicle with a sleeping arrangement according to a further embodiment of the present invention.

At least one of the driver's seat 25 and the passenger's seat 31 is pivotable from a normal use position facing a front of the cab as seen in FIG. 1 to a sleeping position oriented approximately 90° relative to the normal use position, such as in the embodiment shown in FIG. 2. The pivotable seat (here, the passenger's seat 31) is adapted to recline such that the bottom cushion portion 33 and the back portion 35 of the pivotable seat defines at least part of a generally horizontal surface 37 together with the bottom cushion portion 27 of the other one of the driver's seat 25 (as in the embodiment illustrated in FIG. 2) and the passenger's seat. In other embodiments (not shown), both the driver's seat 25 and the passenger's seat 31 can pivot and recline, however, for purposes of discussion, an embodiment wherein only one of the seats is pivoted and reclined is discussed.

For purposes of discussion, the pivotable seat will be the passenger's seat 31, and the other seat will be the driver's seat 25. Also, while the terms "driver's seat" and "passenger's seat" properly describe embodiments of the invention, it will be understood that the present invention has application in connection with other vehicle seats, such as rear seats. For purposes of discussion, however, the terms "driver's seat" and "passenger's seat" will be used. Also, while the present invention is described here in connection with an embodiment for use in a truck cab, it will be appreciated that the present invention has application in other vehicles, such as passenger cars, buses, boats, aircraft, and the like.

Figure 3:
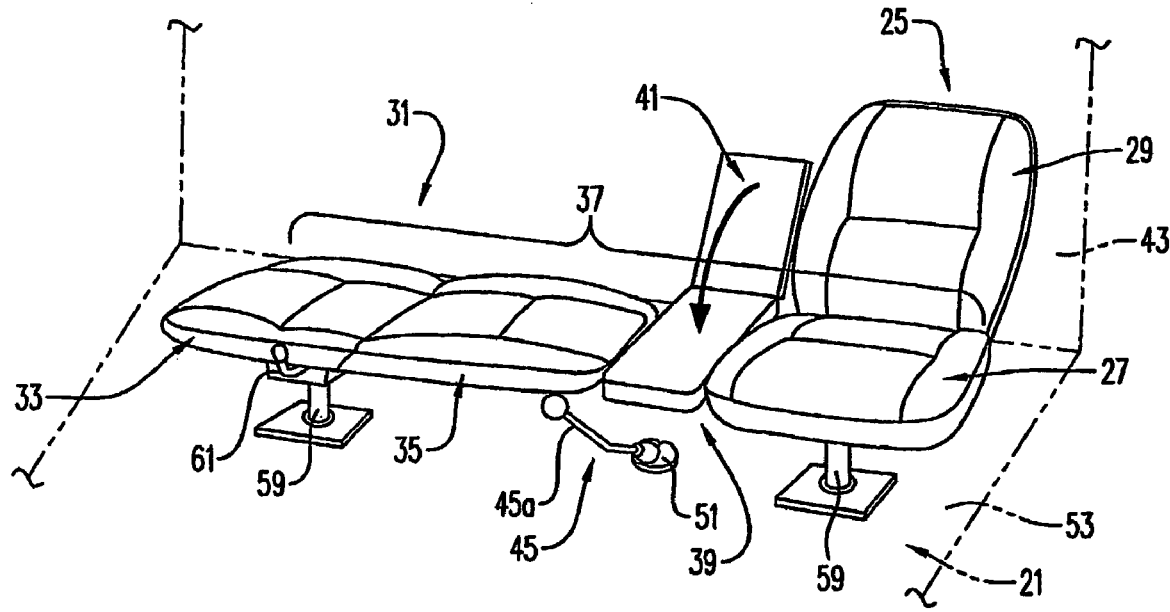
FIG. 3 is a perspective view of a vehicle with a sleeping arrangement according to a further embodiment of the present invention.

In the embodiment shown in FIG. 3, when the passenger's seat 31 is pivoted to the sleeping position, the bottom cushion portion and the back portion of the passenger's seat and the bottom cushion portion of the driver's seat define a gap 39 in the generally horizontal surface. In the embodiment of FIG. 3, a cushion arrangement 41 mounted in the truck cab 21 and is unfoldable to substantially bridge the gap. The word "fold" is used herein with respect to movement of the cushion arrangement to describe the movement that permits the cushion arrangement to be moved from a stored position to a use position and does not necessarily require that the cushion arrangement be folded in the sense of being bent or doubled up upon itself. The cushion arrangement may, for example, be slid or otherwise moved from a stored position to a use position. The cushion arrangement 41 can be mounted in the truck cab 21 in any suitable manner, such as by being hingedly connected to a rear wall 43 of the truck cab so that the cushion arrangement can be stowed in a position up against the rear wall and unfolded to the position bridging the gap between the driver's seat 25 and the passenger's seat. The cushion arrangement 41 may be mounted elsewhere, of course, such as in back of the driver's seat 25 or the passenger's seat 31 or on the floor between the driver's seat and the passenger's seat to list but several options.

Figure 4:
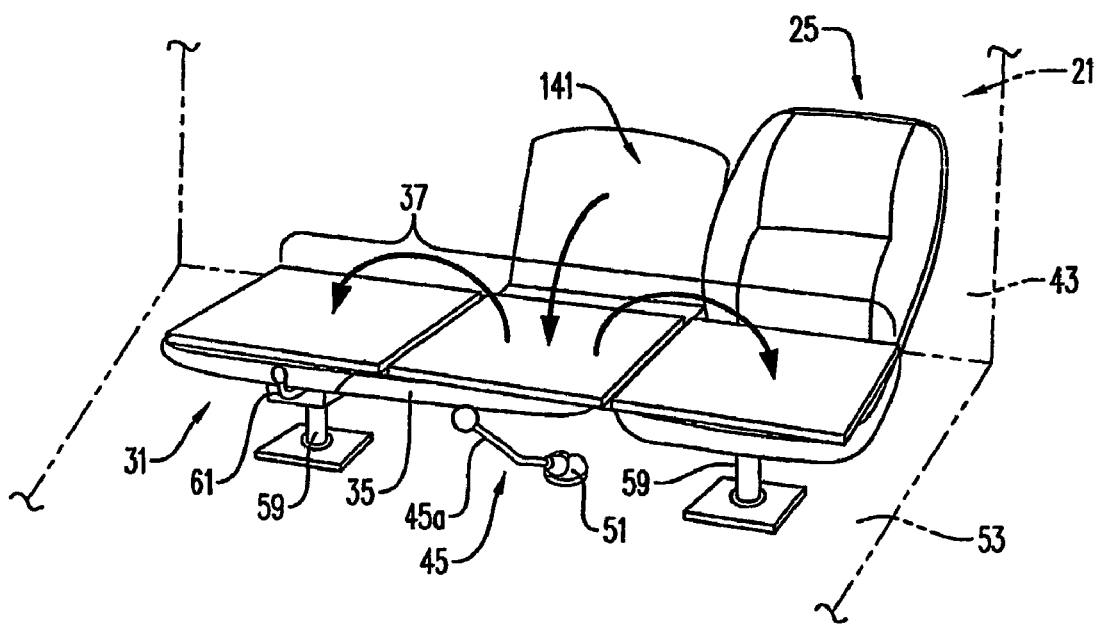
FIG. 4 is a perspective view of a vehicle with a sleeping arrangement according to a further embodiment of the present invention.

FIG. 4 shows an embodiment similar to that of FIG. 3 except that, instead of bridging a gap between the driver's seat 25 and the passenger's seat 31, the cushion arrangement 141 folds down over the back portion 35 of the passenger's seat and then folds out over the generally horizontal surface at least partially defined by the passenger's seat and the driver's seat to define a substantially continuous surface over the generally horizontal surface. Substantially continuous in the sense used here does not necessarily mean continuous in the mathematical sense of having no breaks or irregularities but, rather, is meant to distinguish the surface defined by discrete seats 25 and 31 and bottom cushion portions thereof. While not illustrated, it will be appreciated that the cushion arrangement 41 shown in FIG. 3 that bridges the gap 39 can also fold out over the driver's seat 25 and the passenger's seat 31 to form a continuous or substantially continuous surface over the seat and back portions of those seats.

Figure 5A:
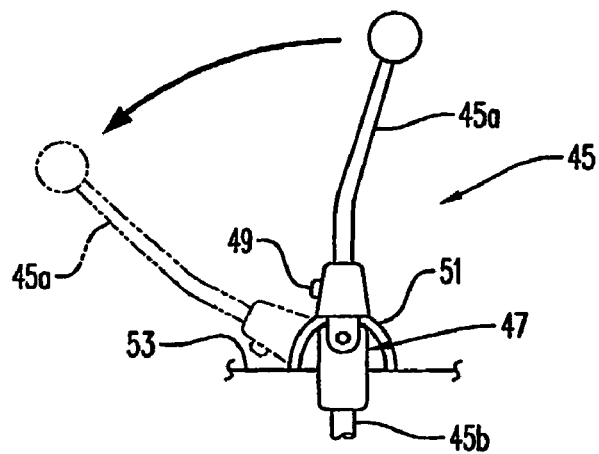
FIG. 5A is a schematic, partially cross-sectional view of a foldable lever arrangement according to an embodiment of the present invention.
Figure 5B:
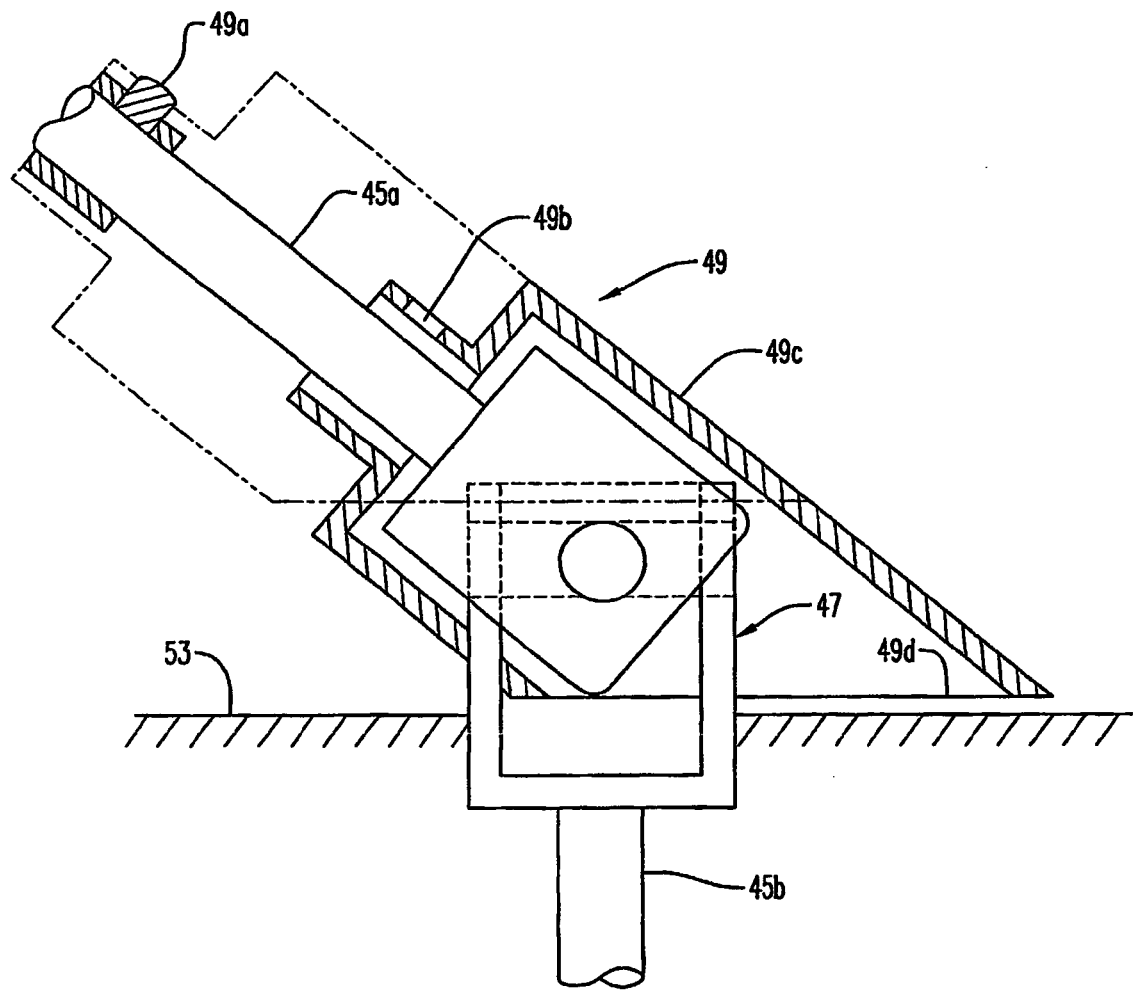
FIG. 5B is a schematic, partially cross-sectional view of a locking arrangement for a foldable lever arrangement according to an embodiment of the present invention.

FIG. 5A shows a lever 45 disposed in the cab 21. The lever 45 in FIG. 5A is the stick shift, however, the lever can be any member ordinarily disposed in a cab, such as a stick shift, a brake, and the like. The lever 45 includes a joint arrangement 47 and a lock arrangement 49. The joint arrangement 47 can include a universal type joint that, when in an unlocked mode in which the joint arrangement is not locked by the locking arrangement, permits an exposed portion 45a of the lever 45 to be folded to one or more positions relative to a base portion 51 that is fixed to a floor 53 of the cab 21. The locking arrangement 49 can be any suitable structure capable of fixing the exposed, "foldable" portion 45a of the lever 45 relative to a concealed portion 45b of the lever concealed by the base portion 51 and the floor 53 so that, when in a locked mode, the foldable portion 45a is not foldable. The locking arrangement 49 may, for example, include a retractable pin that extends through portions of the yokes of a universal type joint 47 or, as seen in FIG. 5B, a spring loaded pin 49a mounted on the exposed portion 45a of the lever 45 that is received in an opening 49b in a cylindrical tube 49c that is cut on a diagonal at a bottom end 49d and, as shown in phantom, is held up above yokes of a universal-type joint 47 when the locking arrangement is unlocked and that, when the pin is removed from the opening in the cylinder, permits the cylinder to fall over the yokes as seen in FIG. 5B to prevent relative movement. In the latter embodiment, when it is desired to unlock the locking arrangement, the cylinder can be lifted and the pin reinserted into the opening in the cylinder. The locking arrangement 49 may also be a member that extends along an axis of the exposed and concealed components of the lever 45.

When the joint arrangement 47 is in the locked mode as seen in FIG. 5A, the lever 45 can be in an operating mode in which it is adapted to change function settings corresponding to use positions of the lever. For example, when the lever 45 is a stick shift, it can shift function settings such as gears depending upon the position of the stick shift. When the lever 45 is a brake, it can shift function settings such as whether an emergency brake is on or off depending upon the position of the brake. When the joint arrangement 47 is in the unlocked mode as seen in FIG. 1, the lever 45 is in a disabled mode and is not adapted to change any function settings corresponding to any use positions of the lever, e.g., it is not possible to use the lever to shift gears or release the emergency brake. When the joint arrangement 47 is in the unlocked mode as seen in FIGS. 1-4 and shown in phantom in FIG. 5A, to the extent that some portion of the lever 45 would extend above an upper place of the generally horizontal surface formed by the driver's seat 25 and the passenger's seat 31 and, if provided, the cushion arrangement 41, the exposed portion 45a of the lever can be folded to a stored position so that it does not interfere with the comfort of the user of the sleeping arrangement 23.

Figure 6A:
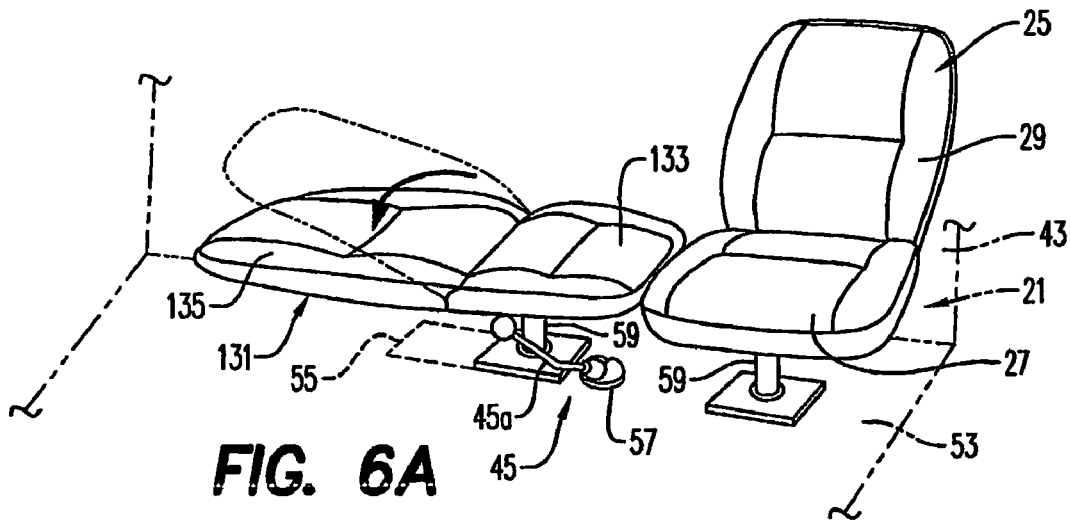
FIGS. 6A and 6B are perspective views of a vehicle with a sleeping arrangement according to further embodiments of the present invention.
Figure 6B:
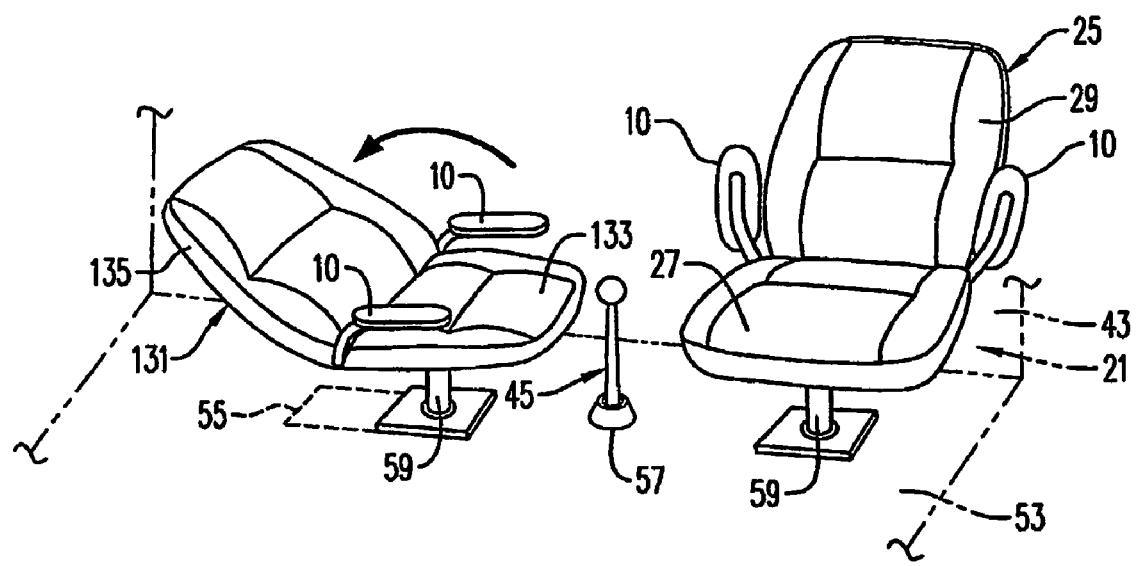

In FIGS. 2-4, the pivotable seat 31 is pivotable such that the back portion 35 is closer to the other seat 25 than the bottom cushion portion 33. However, as seen in FIGS. 6A and 6B, the pivotable seat 131 may be pivotable such that the back portion 135 is closer to the other seat 25 than the bottom cushion portion 133. The embodiment of FIG. 6A shows the back portion 135 reclined to form a substantial plane with the bottom cushion portion 133 although, as shown in phantom, it may be desirable to recline the back portion 135 to a lesser degree. FIG. 6B, shows the back portion 135 reclined to an approximate mid-point between level with the bottom cushion portion 133 and a vertical to the bottom cushion portion. By only partially reclining the back portion 135, a user can rest in a partially inclined fashion which is, in many circumstances, desirable.

The passenger's seat 131 can be pivoted 90° and will slide toward the driver's seat 25 either so that the bottom cushion portion 133 of the pivoted passenger seat substantially abuts the bottom cushion portion 27 of the driver's seat, as seen in FIG. 6A, or so that there is a gap between the bottom cushion portion of the driver's seat and the passenger's seat, as seen in FIG. 6B. A user's legs can be placed on the driver's seat and the user can recline the passenger's seat to a desired angle. The embodiment of FIG. 6B may be more appropriate when it is not practical to provide a collapsible stick shift lever 45, or it is not possible to move the bottom cushion portions of the driver's and passenger's seat together. In the embodiment of FIG. 6B, a user can recline in the passenger's seat 131, the user's feet can rest on the bottom cushion portion 27 of the driver's seat 25, and the stick shift lever 45 can extend between or on opposite sides of the user's legs. In all embodiments of the present invention, the driver's and passenger's seats can be provided with arm rests 10, as seen in FIG. 6B. The arm rests 10 can be adjustable in a conventional manner, and can be moved to a position so that they do not interfere with a user's ability to recline or lie down on the seats.

It may be desirable in any of the embodiments described herein that at least one of the pivotable seat and the other seat is slidable toward and away from the other one of the pivotable seat and the other seat. This can be accomplished in any suitable manner, such as by mounting a slidable one of the seats on a track 55 on the floor 53 of the cab 21 as seen in FIG. 1. Alternatively, a slidable seat may be slidably mounted on a track 57 on a structure such as a post 59 that is fixed to the floor. The slidable seat will ordinarily be adapted to be locked in a desired position relative to the other seat by any suitable means, such by as a clamping arrangement (not shown) fixed to a sliding member and adapted to contact a non-sliding component of the cab.

Figure 7:
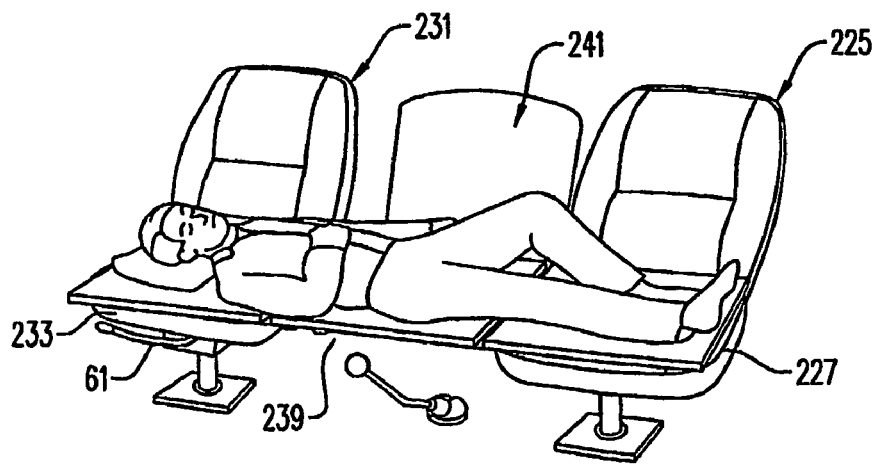
FIG. 7 is a perspective view of a vehicle with a sleeping arrangement according to a further embodiment of the present invention.

The sleeping arrangement according to another embodiment of the present invention shown in FIG. 7 does not require, but does not preclude, that one or both of the driver's seat and the passenger's seat be pivotable. In this embodiment, the driver's seat 225 is mounted in a cab 221, and the passenger's seat 231 is mounted in the cab. A cushion arrangement 241 is mounted in the cab and is unfoldable and adapted to cooperate with the driver's seat and the passenger's seat to define a generally horizontal surface.

In FIG. 7, a gap 239 is defined between the driver's seat 225 and the passenger's seat 231 and the cushion arrangement 241 bridges the gap when in an unfolded position. The cushion arrangement 241 can be unfoldable over bottom cushion portions 227 and 233 of the driver's seat 225 and the passenger's seat 231, respectively, to define a substantially continuous surface over the bottom cushion portions and the gap 239. Of course, in other embodiments (not shown) the cushion arrangement may merely bridge the gap between the driver's seat and the passenger's seat and may not unfold over the bottom cushion portions.

Figure 8A:
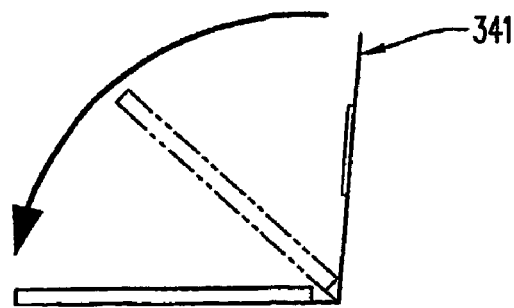
FIG. 8A is a side view of a cushion arrangement according to an embodiment of the present invention showing the cushion arrangement being moved from a folded to an unfolded position.
Figure 8B:
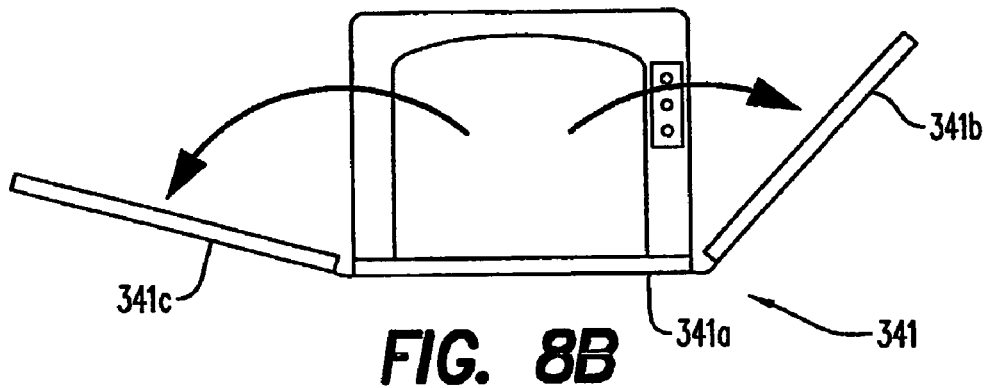
FIG. 8B is a perspective view of the cushion arrangement of FIG. 8A showing left and right panels of the cushion arrangement being unfolded from a central panel of the cushion arrangement.
Figure 8C:
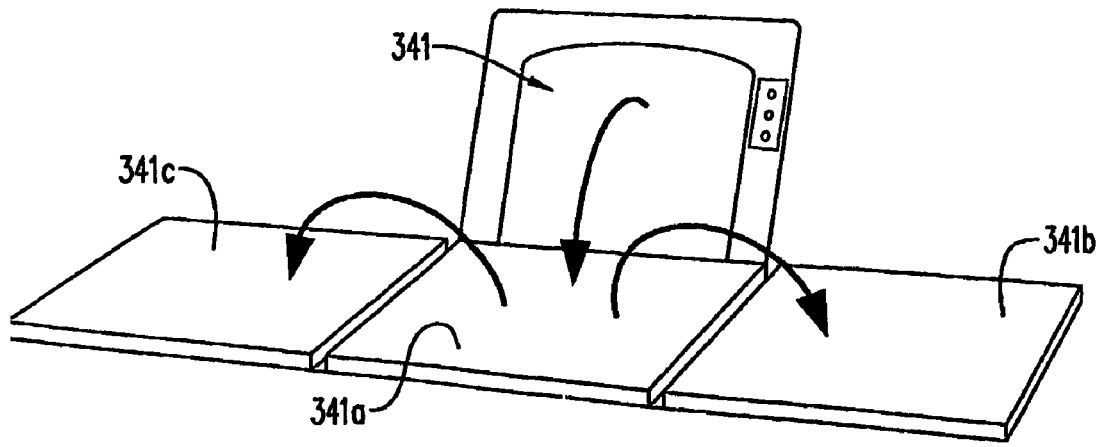
FIG. 8C is a perspective view of the cushion arrangement of FIG. 8A in a fully unfolded condition.

FIGS. 8A-8C show embodiments of a cushion arrangement 341 such as is usable by itself or in connection with seating units such as the driver's seat and passenger's seat shown in FIGS. 1-4 and 6-7. As seen in FIG. 8A, the cushion arrangement 341 can include a central panel 341a that is hingedly mounted to, e.g., the rear wall 43 of the cab 21. The central panel 341a is shown as being hingedly mounted to the rear wall 43 of the cab 21 at a bottom side of the central panel, however, the central panel may be mounted in a variety of forms, and may have more than one degree of freedom. For example, the central panel 341a may be secured to a surface by a joint such as a ball and socket joint at a corner of the central panel so that the central panel can be folded down or up about a horizontal axis as well as folded about a vertical axis. The central panel 341a can be unfolded over a portion of a driver's seat or a passenger's seat, or both, or may be unfolded over a gap between the driver's seat and passenger's seat. The cushion arrangement 341 can be secured in a stored position by any suitable means, such as straps, hook and pile fasteners, and the like.

As seen in FIGS. 8B-8C, left and right panels 341b and 341c, respectively, can be hingedly mounted to the central panel 341a. The left and right panels 341b and 341c can be unfolded relative to the central panel 341a so that they extend over seat and/or back portions of driver's seats and passenger's seats.

The cushion arrangement 341 can be provided with structures such as internal support beams to facilitate supporting a user over, e.g., a gap between a driver's seat and a passenger's seat, or can be entirely void of such support structures. In addition, the cushion arrangement 341 can be provided with structures such as support beams to facilitate using the cushion arrangement with or without the driver's seat and the passenger's seat. For example, internal support beams can be provided, along with unfoldable legs for supporting the cushion arrangement without the driver's seat and the passenger's seat. Also, support members and/or legs can be secured to the cushion arrangement in any suitable fashion after unfolding, instead of having such members forming part of the cushion arrangement.

In all of the embodiments, the reclining seats may be reclined to a desired angle in a substantially conventional manner, such as by a lever 61. The lever 61, a separate lever, or some other conventional structure may also be arranged to permit or prevent pivoting of the seats relative to one another. Of course, conventional electronic seat position controls (not shown) may be provided instead of levers and the like.

References to a "cushion" herein are not intended to limit structures such as the bottom cushion portion of the seat or the cushion arrangements to structures such as padded surfaces, although it is anticipated that such structures will ordinarily be padded. The bottom cushion portion and the cushion arrangements may, for example, be unpadded, hard structures.

In the present application, the use of terms such as "including" is open-ended and is intended to have the same meaning as terms such as "comprising" and not preclude the presence of other structure, material, or acts. Similarly, though the use of terms such as "can" or "may" is intended to be open-ended and to reflect that structure, material, or acts are not necessary, the failure to use such terms is not intended to reflect that structure, material, or acts are essential. To the extent that structure, material, or acts are presently considered to be essential, they are identified as such.

While this invention has been illustrated and described in accordance with a preferred embodiment, it is recognized that variations and changes may be made therein without departing from the invention as set forth in the claims.

What is claimed is:

1. A vehicle with a sleeping arrangement, comprising:
a vehicle compartment;
a driver's seat mounted in the compartment, the driver's seat having a bottom cushion portion and a back portion; and
a passenger's seat mounted in the compartment, the passenger's seat having a bottom cushion portion and a back portion, wherein at least one of the driver's seat and the passenger's seat is pivotable from a normal use position facing a front of the compartment to a sleeping position oriented approximately 90° relative to the normal use position, and the pivotable seat is adapted to recline such that the bottom cushion portion and the back portion of the pivotable seat defines at least part of a generally horizontal surface together with the bottom cushion portion of the other one of the driver's seat and the passenger's seat.

2. A vehicle with a sleeping arrangement as set forth in claim 1, wherein the bottom cushion portion and the back portion of the pivotable seat and the bottom cushion portion of the other seat define a gap in the generally horizontal surface.

3. A vehicle with a sleeping arrangement as set forth in claim 2, comprising a cushion arrangement mounted in the vehicle compartment and unfoldable to substantially bridge the gap.

4. A vehicle with a sleeping arrangement as set forth in claim 3, wherein the cushion arrangement is foldable over the generally horizontal surface to define a substantially continuous surface over the generally horizontal surface.

5. A vehicle with a sleeping arrangement as set forth in claim 3, wherein the cushion arrangement is mounted to a rear wall of the compartment.

6. A vehicle with a sleeping arrangement as set forth in claim 3, further comprising a lever disposed in the compartment and movable between a use position in which the lever at least partially extends above an upper plane of the generally horizontal surface and a stored position in which the lever is disposed below the upper plane.

7. A vehicle with a sleeping arrangement as set forth in claim 6, wherein the lever extends above the upper plane in the gap when in the use position.

8. A vehicle with a sleeping arrangement as set forth in claim 2, further comprising a lever disposed in the compartment and movable between a use position in which the lever at least partially extends above an upper plane of the generally horizontal surface and a stored position in which the lever is disposed below the upper plane.

9. A vehicle with a sleeping arrangement as set forth in claim 8, wherein the lever extends above the upper plane in the gap when in the use position.

10. A vehicle with a sleeping arrangement as set forth in claim 1, comprising a cushion arrangement mounted in the vehicle compartment and unfoldable over the bottom cushion portion and the back portion of the pivotable seat and the bottom, cushion portion of the other seat.

11. A vehicle with a sleeping arrangement as set forth in claim 1, wherein the pivotable seat is pivotable such that the back portion is closer to the other seat than the bottom cushion portion.

12. A vehicle with a sleeping arrangement as set forth in claim 11, wherein at least one of the pivotable seat and the other seat is slidable toward and away from the other one of the pivotable seat and the other seat.

13. A vehicle with a sleeping arrangement as set forth in claim 1, wherein the pivotable seat is pivotable such that the bottom cushion portion is closer to the other seat than the back portion.

14. A vehicle with a sleeping arrangement as set forth in claim 13, wherein at least one of the pivotable seat and the other seat is slidable toward and away from the other one of the pivotable seat and the other seat.

15. A vehicle with a sleeping arrangement as set forth in claim 1, wherein at least one of the pivotable seat and the other seat is slidable toward and away from the other one of the pivotable seat and the other seat.

\* \* \* \* \*